United States Patent [19]
Hirsch et al.

[11] Patent Number: 5,497,867
[45] Date of Patent: Mar. 12, 1996

[54] SYNCHRONIZER WITH CONE CUP LOCATER PINS

[75] Inventors: Mark A. Hirsch, Vicksburg; Donald M. Stout, Troy, both of Mich.; Derek P. J. Corns, Swinton, England; Patrick Randrianarison, Nantes, France; George Skotnicki, Rochdale, England

[73] Assignee: Eaton Corporation, Cleveland, Ohio

[21] Appl. No.: 311,982

[22] Filed: Sep. 26, 1994

Related U.S. Application Data

[63] Continuation-in-part of Ser. No. 172,963, Dec. 27, 1993, abandoned.

[51] Int. Cl.⁶ .............................. F16D 23/06; F16D 21/00
[52] U.S. Cl. .................... 192/48.91; 192/109 R; 192/53.3
[58] Field of Search ................ 192/48.91, 53 E, 192/109 R; 74/339

[56] References Cited

U.S. PATENT DOCUMENTS

| | | | |
|---|---|---|---|
| 1,909,644 | 5/1933 | Westcott | 74/339 X |
| 3,078,975 | 2/1963 | Eaton | 192/53 E |
| 3,109,317 | 11/1963 | Cousino et al. | 74/339 X |
| 4,462,489 | 7/1984 | Morscheck | 192/53 E |
| 5,078,244 | 1/1992 | Olson | 192/53 E |
| 5,092,438 | 3/1992 | Reynolds et al. | 192/53 E |
| 5,111,922 | 5/1992 | Reynolds | 192/53 E |

Primary Examiner—Rodney H. Bonck
Attorney, Agent, or Firm—Howard D. Gordon; Paul S. Rulon

[57] ABSTRACT

A pin-type, double-acting synchronizer mechanism (18) with friction clutches (20,32 and 22,34), jaw clutches (24, 14b and 26,16b) and self-energizing ramps. The ramps act between a shaft (12) and a shift flange (28) which is rotatable relative to the shaft and jaw clutch members (24,26). Flange (28) includes radially inwardly extending teeth (48) defining self-energizing ramps (48a,48b,48c,48d) which act against ramps (50a,50b,50c,50d) defined by a post-like portion (50) formed from shaft splines (12b). Three circumferentially spaced pins (36) include blocker shoulders for preventing asynchronous engagement of the jaw clutches and pre-energizer surfaces which each cooperate with a pre-energizer assembly (38). Friction members (20,22) of the friction clutches are slidably splined to gears to prevent relative rotation therebetween and abut surfaces (14d,16d) defined by gears (14,16) to limit axial movement away from mating friction rings (32,34), respectively. Axial movement toward the mating friction rings is limited by rigid pins (44) slidably extending through openings (32b,34b) in the rings.

9 Claims, 4 Drawing Sheets

SYNCHRONIZER WITH CONE CUP LOCATER PINS

This is a continuation-in-part of application Ser. No. 08/172,693 filed on Dec. 27, 1993 and now abandoned.

FIELD OF THE INVENTION

This invention relates to pin-type synchronizer mechanisms for a transmission. More specifically, the invention relates to axially retaining a cone friction member for such mechanisms.

BACKGROUND OF THE INVENTION

It is well known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. A prior art example of a pin-type synchronizer mechanism with self-energization may be seen by reference to U.S. Pat. No. 5,092,439, which is incorporated herein by reference.

The pin-type synchronizer mechanism disclosed in the above patent includes friction and jaw members for respectively synchronizing and positive clutching axially spaced apart gears to a shaft; blockers engaged in response to a pre-energizer effecting initial engagement of the friction members in response to initial engaging movement of one of the jaw members by a shift force, the blockers being operative to prevent asynchronous engagement of the jaw members and to transmit the shift force to the friction members to increase synchronizing torque thereof, and self-energizing ramps reacting the torque to provide an additional force in the direction of and additive to the shift force for further increasing the synchronizing torque of the friction members. A pin-type synchronizer mechanism employing the invention herein may or may not include self-energizing ramps.

Many pin-type synchronizer mechanisms include rings having cone friction surfaces that are axially movable from a neutral position of the synchronizer mechanism into mating engagement with cone friction surfaces defined by members affixed against rotation and all axial movement relative to the gears.

Such axial affixing of the members is preferred to ensure clearance between the friction surfaces when the synchronizer mechanism is in neutral, to ensure disengagement of the surfaces when the synchronizer mechanism is moved from an engaged position to neutral position, ensure or mitigate inadvertent engagement of self-energizing ramps due to, for example, viscous shear drag of oil between the friction surfaces producing a torque, etc.

In some transmission installations, it is difficult and/or cost prohibitive to axially affix some of the members to the gears. The invention disclosed herein negates the need to affix the members against all axial movement. The invention also ensures the above mentioned clearance, disengagement and mitigation of viscous shear drag in the event of failure of other means used to initially axially affix the members to the gears.

SUMMARY OF THE INVENTION

An object of this invention is to improve the functional relation between friction surfaces of a synchronizer mechanism.

According to a feature of the invention, a pin-type synchronizer mechanism is selectively operative to frictionally synchronize and positive connect either of first and second axially spaced apart drives to a shaft. The drives are mounted for relative rotation about an axis common to the shaft and secured against axial movement relative to the shaft. Drive jaw means are affixed to each drive and engageable with axially movable jaw means having axially extending internal splines slidably mating continuously with axially extending external splines affixed to the shaft. First and second cone friction surfaces are respectively defined by axially spaced apart first and second members that are respectively secured by attachment means for fixed rotation with the first and second drives and for limited axial movement away from the space between the gears. Third and fourth cone friction surfaces are defined by a pair of axially spaced apart rings disposed concentric to the shaft means and axially movable between the spaced apart drives for axial movement into engagement respectively with the first and second friction surfaces to synchronize the drives with the shaft. A flange extends radially between the rings for axially moving the movable rings and jaw means into the engagement in response to an axially bidirectional shift force ($F_o$) applied to the flange. Means are provided to secure the flange against axial movement relative to the axially movable jaw means. Blocker means prevent engagement of the jaw means prior to the synchronizing. The blocker means include a plurality of circumferentially spaced apart and axially extending pins which rigidly secure the rings together. The pins extend through openings in the flange. Each pin has axially spaced apart blocker shoulders that are engageable with blocker shoulders defined on opposite sides of the flange and about the associated openings. Pre-energizers are for engaging either one of the third and fourth friction surfaces respectively with the first and second friction surfaces in response to initial axial movement of the flange by the shift force from a neutral position toward one of the drives, for engaging the blocker means in response to engagement of the friction surfaces producing a synchronizing torque transmitted to the flange via the pins, and for transmitting the shift force to the engaged friction surfaces via the engaged blocker means to increase the engaging force of the engaged friction surfaces.

The invention is characterized by: the attachment means allowing axial movement of the first and second friction members in a direction toward the friction rings, and a plurality of circumferentially spaced apart rigid members are axially interposed between the first and second members for limiting or arresting axial movement toward the friction rings.

BRIEF DESCRIPTION OF THE DRAWINGS

The synchronizer mechanism of the invention is shown in the accompanying drawings in which:

FIGS. 5 and 6 are detailed views of a plunger component and a pin component in FIGS. 1 and 2;

FIG. 10 is a graphical representation of axial forces and torques acting on a shift flange of the synchronizer.

DETAILED DESCRIPTION OF THE DRAWINGS

The term "synchronizer clutch mechanism" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer clutch mechanism which includes ramps or cams or the like to increase the engaging force of the synchronizing clutch in proportion to the synchronizing torque of the friction clutch.

Figure 1:
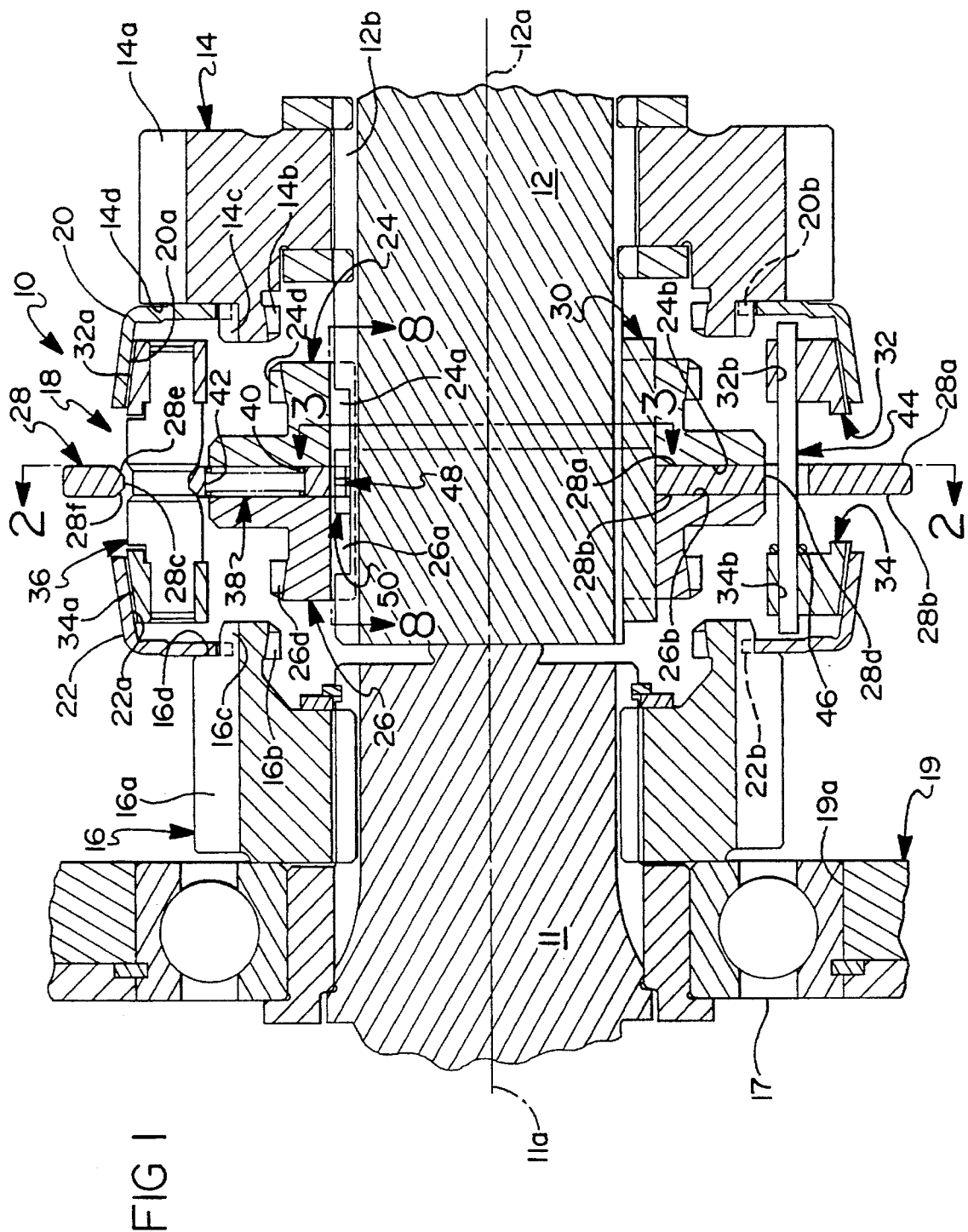
FIG. 1 is a sectional view of a double-acting synchronizer mechanism looking along line 1—1 of FIG. 2.
Figure 2:
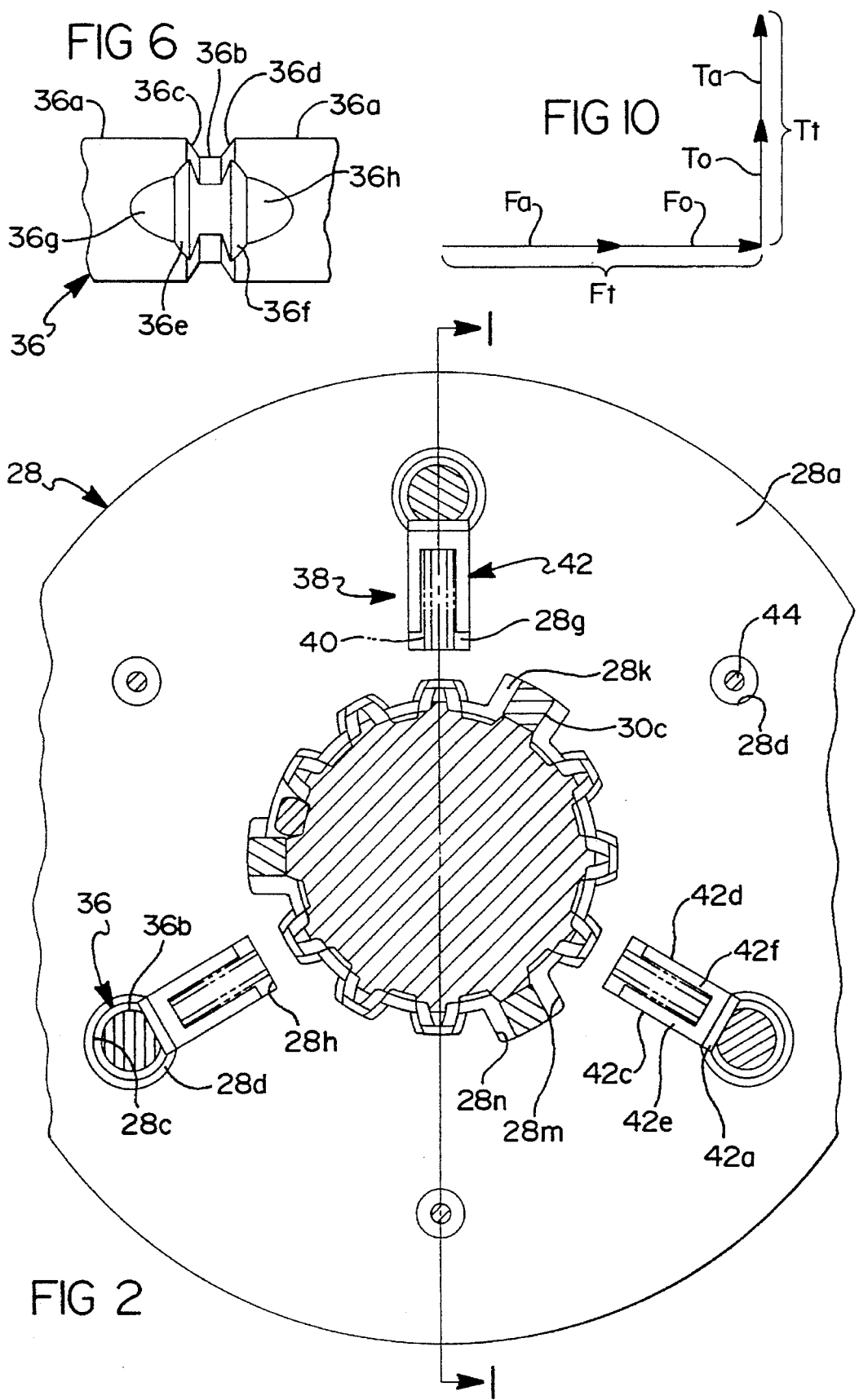
FIG. 2 is a partially sectioned view of the mechanism looking along line 2—2 of FIG. 1.
Figure 3:
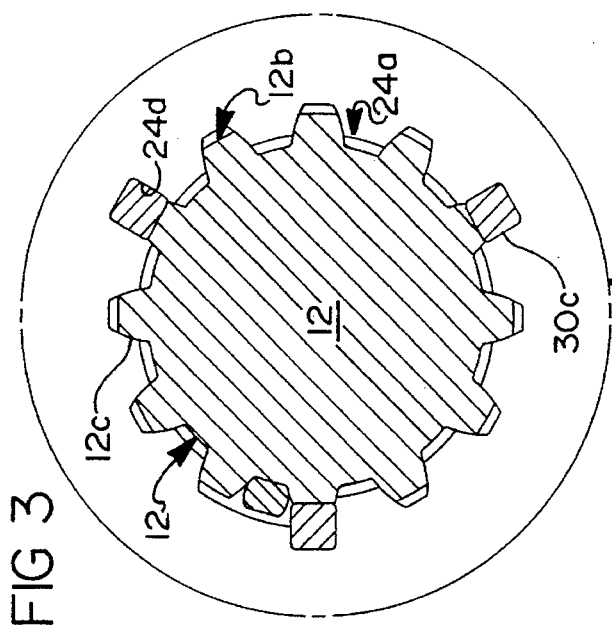
FIG. 3 is a sectional view of a portion of the mechanism looking along line 3—3 of FIG. 1.

Looking first mainly at FIGS. 1 and 2, therein is shown a gear and synchronizer assembly 10 for an otherwise unshown transmission of the type intended for use in a land vehicle, particularly of the type used in heavy duty trucks. However, assembly 10 may be used in other applications. The assembly includes a transmission input shaft 11 and a main shaft 12 mounted for rotation about a generally common axes 11a and 12a, spaced apart ratio gears 14,16 rotatably supported on the shaft and secured against axial movement relative to the shaft by annular thrust members affixed to the shaft in known manner, and a double-acting pin-type synchronizer clutch mechanism 18. When assembly 10 is part of a twin countershaft transmission, such as disclosed in U.S. Pat. Nos. 3,648,546 and 4,788,889, which patents are incorporated herein by reference, teeth 14a on gear 14 will be in constant mesh with gears on unshown countershafts driven by gear 16, shaft 12 will be connected to or selectively connectable to a load, and shaft 12 will be free to move somewhat radially as is well known in the prior art. Gear 16 is splined to input shaft 11 and teeth 16a are in constant mesh with teeth of gears on the unshown countershafts.

Figure 4:
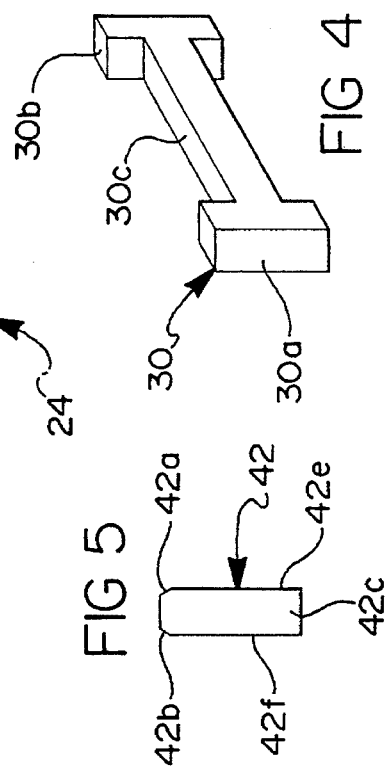
FIG. 4 is a perspective view of a component in FIGS. 1 and 2.
Figure 5:
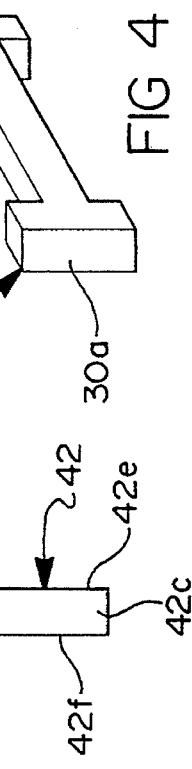

The synchronizer mechanism 18 includes annular friction members or cone cups 20,22 and annular jaw clutch members 14b,16b secured for rotation with gears 14,16, jaw clutch members 24,26 having internal spline teeth 24a,26a slidably mating with external spline teeth 12b integrally formed with the shaft or otherwise affixed thereto, a radially extending shift flange 28, having axially oppositely facing sides 28a,28b sandwiched between axially facing surfaces 24b,26b of the jaw members 24,26, three H-shaped retainer members 30 (one of which is shown in perspective in FIG. 4) for securing the flange and jaw members against relative axial movement, annular friction members or rings 32,34 rigidly secured together by three circumferentially spaced apart pins 36 extending axially from each of the friction members and through openings 28c in the flange, and three pre-energizer assemblies 38 each including a spring 40 and a plunger 42 which reacts with surfaces defined by the pins. The number of retainers 30, pins 36 and assemblies 38 may be more or less than disclosed herein.

Shaft 11, gear 16 and a bearing 17 are preferably installed as an assembly through a bearing race support opening 19a in a partially shown housing wall 19 of the transmission. Since the diameter of friction member 22 is greater than the diameter of opening 19a, member 22 is installed on gear 16 after the assembly is installed.

Friction members 20,22 have internal cone friction surfaces 20a,22a which respectively mate with external cone friction surfaces 32a,34a of annular friction members 32,34. As is readily seen, friction members 20,32 and 22,34 pair up to define friction clutches for synchronizing the gears to the shaft prior to engagement of the jaw clutches. Friction members 20,22 include internal splines 20b,22b which slidably mate with external splines 14c,16c defined by gears 14,16 for preventing relative rotation therebetween. Abutment or reaction surfaces 14d, 16d defined by gears 14,16 limit axial movement of members 20,22 away from the space between the gears. Axial movement of members toward the space between the gears is limited or prevented by a plurality of rigid, elongated members 44 slidably extending through axially aligned openings 32b,34b in members 32,34 and openings 28c in flange 28. A spring clip or an elastic band 46, such as an o-ring griping member 44, may be used to retain each member 44 in position prior to installation of members 32,34 between members 20,22. Members 44 also ensure disengagement of the cone surfaces when either of the movable jaw members 24,26 is moved from an engaged position to the neutral position.

A wide range of cone angles may be used; cone angles of seven and one-half degrees are employed herein. The friction surfaces may be defined by any of several known friction materials affixed to the base member; herein, pyrolytic carbon friction materials, such as disclosed in U.S. Pat. Nos. 4,700,823; 4,844,218; and 4,778,548 are preferred. These patents are incorporated herein by reference.

Pins 36 are shown in greater detail in FIG. 6. Each pin includes major diameter portions 36a having diameters slightly less than the diameter of flange openings 28c, a reduced diameter or groove portion 36b spaced between friction rings 32,34 (herein midway), conical blocker shoulders or surfaces 36c,36d extending radially outward from the pin axis and axially away from each other at angles herein of about forty degrees relative to a line normal to the pin axis, and preferably, but not necessarily, independent pre-energizer surfaces 36e,36f and extended secondary centering surfaces 36g,36h. The grooved portions, when disposed within their respective flange openings, allow limited rotation of the rigid friction ring and pin assembly relative to the flange to effect engagement of the pin blocker shoulders with chamfered blocker shoulders 28e,28f defined about the flange openings. The pre-energizer surfaces 36e, 36f chordally intersect or remove a portion of conical blocker shoulders 36c,36d, are preferably (but not necessarily) flat planar surfaces and form angles relative to the pin axis which are somewhat less than the angles of the blocker surfaces. Centering surfaces 36g,36h are also flat planar surfaces and, as is readily apparent in the drawings, form angles relative to the pin axis which are substantially less than the angles of the blocker and pre-energizer surfaces. As disclosed herein, the chordal extents of the flat surfaces are tangent to circles concentric to the pin axis and the shaft axis. Alternatively, surfaces 36e–36f may be dispensed with, pre-energizer plunders 124 then react against blocker surfaces 36c,36d.

The helical compression springs 40 disposed in slots 28g of the flange bias plungers 42 radially outward toward the pin pre-energizer surfaces. The major extent of the slots preferably extends radially relative to the shaft axis. The slots also extend axially through the flange sides 28a,28b, into flange openings 28c, and have ends 28h at their radially inward extent for the springs to react against.

As previously mentioned, jaw members 24,26 include internal spline teeth 24a,26a slidably mating with external spline teeth 12b affixed to the shaft. The external splines have involute flank surfaces 12c extending parallel to the shaft axis, and the mating thereof with flank surfaces of the jaw member splines prevents relative rotation therebetween. H-shaped members 30 each include end portions 30a,30b, which react against jaw member surfaces 24c,26c, and a center portion 30c which interconnects the end portions. The center portion extends snugly through axially extending slots 24d,26d in the jaw members and freely through openings 28k having radially extending stop surfaces 28n,28m which cooperate with center portion 30c to limit rotational movement of the flange relative to the jaw members and shaft for reasons explained hereinafter.

Figure 7:
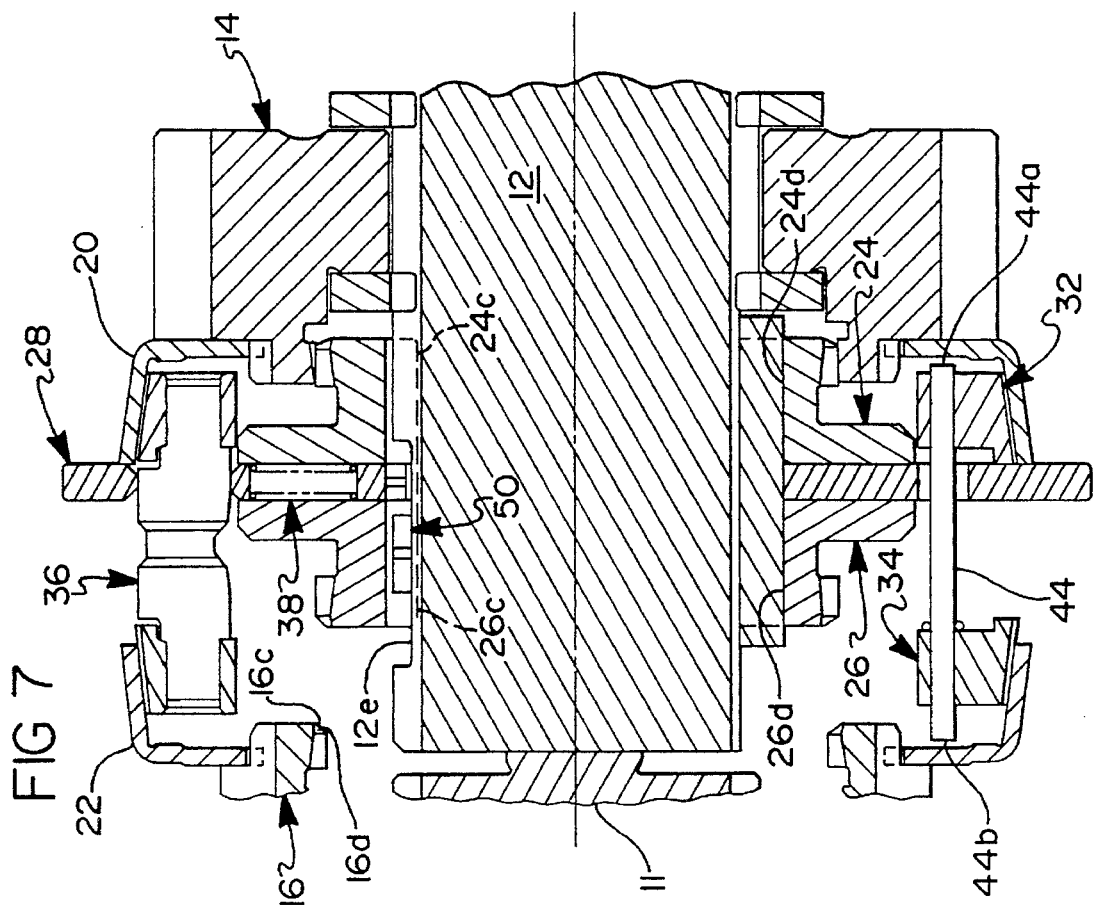
FIG. 7 is a partial view of the mechanism in FIG. 1 with a jaw clutch thereof in an engaged position.
Figure 8:
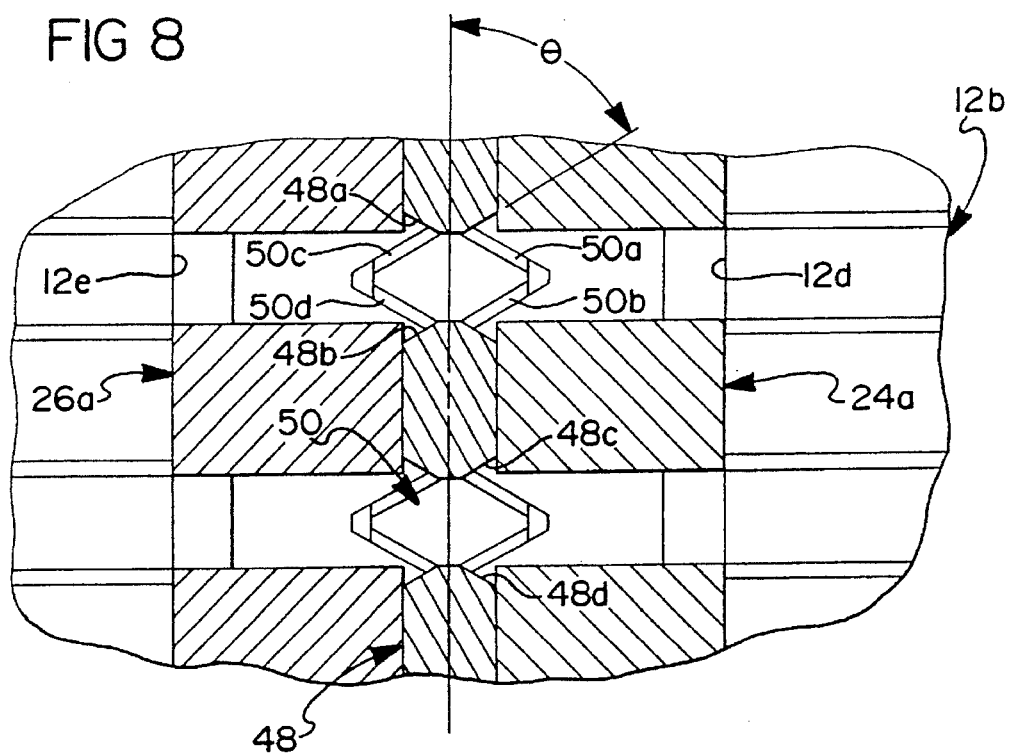
FIGS. 8 and 9 are sectional views of toothed portions of the mechanism looking along line 8—8 of FIG. 1.

As best seen in FIGS. 1–2 and 7–10, portions of some of the external teeth 12b of the shaft in both axial directions from the FIGS. 1, 2 and 8 neutral position of flange 28 are modified to provide one or more ramp surfaces which cooperate with a like number of ramp surfaces defined by reaction means or internal teeth 48 extending radially inward from flange 28 and into the axially extending spaces between shaft splines 12b. The ramp surfaces allow limited rotation of the flange relative to jaw members 24,26 and shaft 12, and react synchronizing torque between the cone clutches and shaft to provide an additive axial self-energizing force for increasing the engaging force of the cone clutch initially engaged by a shift force applied to flange 28, thereby increasing the synchronizing torque provided by the cone clutch. Ramp surfaces may be provided for increasing synchronizing force for one or both gears and/or for increasing synchronizing force in response to torque in either direction, as is encountered for up and down shifts. More specifically, each tooth 12b, circumferentially between each H-shaped retainer center portion 30c, has first and second axially spaced apart recesses defining annular grooves having first ends defined by post-like portions 50, axially opposite ends 12d, 12e, and minimum outside diameters 12e. The minimum outside diameters 12e are greater than the root diameter of splines 12b and greater than the inside diameters 24c,26c of the jaw clutch splines 24a,26a. Also, the minimum outside diameters 12e are less than the inside of the flange internal teeth 48. The post-like portions 50 have a diamond-shape, formed by removing portions of each tooth in both axial directions therefrom. The axial and radial extent of the removed portions are selected to facilitate ease of machining boost ramp surfaces 50a,50b,50c,50d on post portion 50 and to minimize the effects such removal has relative to the strength of the teeth 12b. Further, spline teeth 12b are provided with sufficient radial depth to ensure that the ramp surfaces have enough surface area to minimize wear due to forces acting thereon. The axial extent of the removed portions or recesses between axial ends 50a,50b of post portions 50 and axial ends 12c, 12d of teeth 12 are formed by simply machining annular grooves in the teeth. The axial length of the removed portions is sufficient to facilitate insertion of a machining tool to form the ramp surfaces. Ramp surfaces 50a,50b respectively react against ramp surfaces 48a,48b on flange teeth 48 to provide the additive axial forces ($F_a$) to increase or assist the synchronization rate of gear 14 in response to torque in either direction. Ramp surfaces 50c,50d respectively react against ramp surfaces 48c,48d to provide the additive axial forces ($F_a$) for gear 16 in response to synchronizing torque in either direction. The angles of the ramp surfaces may be varied to provide different amounts of additive axial force for up and down shifts and for high and low speed ratios. Also, if no additive axial force is preferred in one direction for one gear or more, the ramp surfaces may be parallel to the spline, i.e., no effective ramp surfaces are provided. The magnitude or amount of the axial additive forces, as explained further hereinafter, is also a function of the mean radii ratio of friction clutches and self-energizing ramps. Accordingly, the magnitude of the additive forces for a given shift force applied to shift flange 28 by a shift fork may be varied by varying the ramp angles and/or the mean radii ratio. Internal teeth 48 and post-like portions 50 may be provided with non-boost surfaces or flats 48e and 50e on circumferentially opposite sides thereof. The non-boost surfaces react against each other while flange 28 is in the neutral position to prevent activation of the self-energizing ramps in the event either of the cone clutches produce a torque due to, for example, viscous shear of oil between the friction surfaces.

With reference to FIGS. 1 and 8, when the flange 28 is in the neutral position, reduced diameter portions 36b of pins 36 are radially aligned with their associated flange openings 28c, friction surfaces of the cone clutches are slightly spaced apart and are maintained in this spaced relation by angled pre-energizer surfaces 42a,42b of the plungers 42 acting on pre-energizer surfaces 36e,36f of pins 36 by the force of springs 40 and by ends 44a,44b of elongated members 44 abutting friction members 20,22. When it is desired to couple either gear to the shaft, an appropriate and unshown shift mechanism, such as disclosed in U.S. Pat. No. 4,920,815 and incorporated herein by reference, connected to the outer periphery of flange 28 in known manner for moving the flange axially along the axis of shaft 12 either left to couple gear 16 or right to couple gear 14. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 28 in an axial direction and is represented by the length of arrow $F_o$ in FIG. 10.

Initial rightward axial movement of flange 28 by the operator shift force $F_o$ is transmitted by pre-energizer plungers 42 to the pins by pre-energizer surfaces 36f to effect initial frictional engagement of cone surface 32a with cone surface 20a. The initial engagement force of the cone surfaces is, of course, a function of the force of springs 40 and the angles of the pre-energizer surfaces. The initial frictional engagement (provided an asynchronous condition exists and momentarily ignoring the effect of the self-energizing ramps) produces an initial cone clutch engaging force and synchronizing torque $T_o$ which ensures limited relative rotation between flange 28 and the engaged friction ring, and hence, movement of the reduced diameter pin portions 36b to the appropriate sides of the flange openings 28c to provide engagement of pin blocker shoulders 36c with flange blocker shoulders 28e. When the blocker shoulders are engaged, the full operator shift force $F_o$ on flange 28 is transmitted to friction ring 32 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 10. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 28c to allow continued axial movement of the flange and engagement of the external jaw teeth 24d of jaw member 24 with internal jaw teeth 14b of gear 14, as shown in FIG. 7. As is known in the prior art and as is specified by reference numbers only for jaw teeth 16b in FIG. 7, the lead portions of the jaw teeth have rake leading edges 16c to reduce tooth damage during initial contact, and have chamfer or wedge faces 16d to clock the teeth into mating alignment. Jaw teeth with such lead portions are disclosed in greater detail in U.S. Pat. No. 4,246,993 which is incorporated herein by reference along with U.S. Pat. No. 3,265,173 which provides a teaching for the proper rake angles. The wedge faces, which may be asymmetric, prevent delay of shift completion due to abutting contact of the leading edges of the teeth. To facilitate smooth and relatively effortless completion of shifts, the jaw teeth are preferably as fine or small, as practicable, in the circumferential direction, thereby minimizing the number or rotational clocking degrees necessary to matingly align the jaw teeth. Also, the jaw teeth are preferably disposed about as large a diameter as is practicable.

Still ignoring the effects of the self-energizing ramps, cone clutch torque provided by the force $F_o$ is expressed by the following equation:

$$T_o = F_o R_c \mu_c / \sin\alpha$$

where:
$R_c$=the mean radius of the cone friction surface,
$\mu_c$=the coefficient of friction of the cone friction surface, and
$\alpha$=the angle of the cone friction surfaces.

Figure 9:
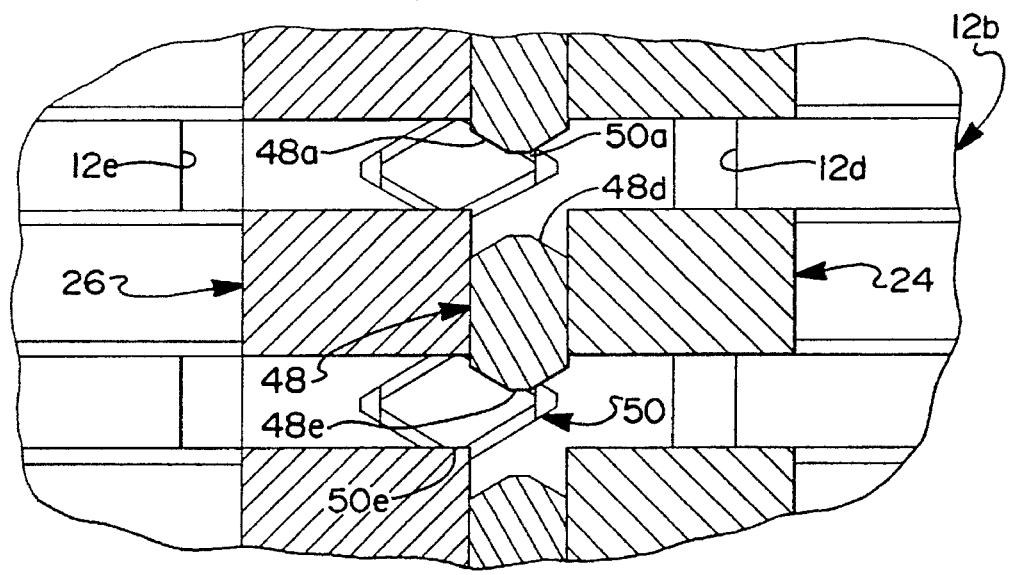

Looking now at the affects of the self-energizing ramps and referring particularly to FIGS. 8 and 9, the synchronizing torque $T_o$ due to the operator applied axial shift force $F_o$ is, of course, transmitted to flange 28 by pins 36 and is reacted to shaft 12 across the self-energizing ramp surfaces. The self-energizing ramp surfaces, when engaged, limit rotation of the flange relative to shaft 12 and jaw members 24,26 and produce an axial force component or axial additive force $F_a$ acting on the flange in the same direction as shift force $F_o$, thereby further increasing the engaging force of the cone clutch to provide an additive synchronizing torque $T_a$ which adds to the torque $T_o$. FIG. 8 illustrates the position of the self-energizing ramp surfaces and the position of the jaw member splines 24a,26a to the shaft splines 12b while shift flange 28 is in the neutral position corresponding to the position of FIG. 1. FIG. 9 illustrates a position of the ramps and splines while gear 14 is being synchronized by engaged cone surfaces 32a,20a. The engaged cone surfaces are producing a synchronizing torque in a direction which has effected engagement of flange member ramp surfaces 48a with shaft ramp surfaces 50a. Hence, the sum of the axial forces for engaging the cone clutch are $F_o$ plus $F_a$ and the sum of the synchronizing torques being produced by the cone clutch are $T_o$ plus $T_a$, as graphically shown in FIG. 10. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to significantly increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected, the force $F_a$ will rapidly and uncontrollably increase independent of the force $F_o$, thereby driving the cone clutch toward lockup. Self-locking rather than self-energizing decreases shift quality or shift feel, may over stress synchronizer components, may cause over heating and rapid wear of the cone clutch surfaces, and may even override operator movement of the shift lever.

The main variables for calculating self-energizing ramp angles for providing additive axial forces $F_a$, which increase or decrease in proportion to operator forces $F_o$, are cone clutch angle, cone clutch coefficient of friction, mean radii ratio of the cone clutch and of the self-energizing ramps, ramp coefficient of friction, and pressure angle of the self-energizing ramps. The pressure angle may be zero. Herein, the ramps have a pressure angle of 20 degrees. Further details for calculating and controlling self-energizing or boost forces may be obtained by reference to U.S. Pat. No. 5,092,439 which, as previously mentioned, is incorporated herein by reference.

Figure 11:
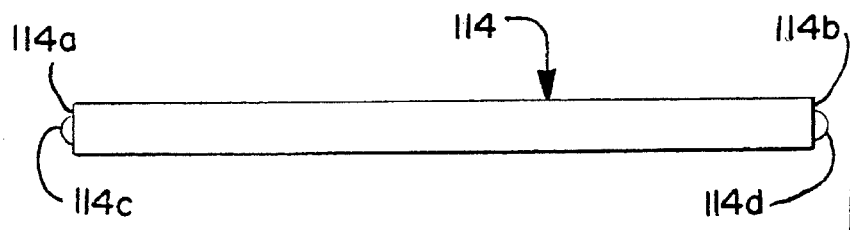
FIG. 11 is an enlarged view of an alternative embodiment of a portion of the synchronizer mechanism.

FIG. 11 illustrates an alternative embodiment of the elongated member 44. In the alternative embodiment each elongated member is designated 114 and is modified at its ends 114a, 114b to include antifriction means 114c, 114d to reduce drag between the ends and cone cups 20, 22. Such drag is detrimental to shift performance, and may cause failures due to wear and heat generation where the ends contact the cone cups. Herein, the antifriction means 114c, 114d are each a ball bearing retained in a pocket in the ends 114a, 114b. Lubrication between each pocket and ball may be provided by impregnating each pocket with a lubricant in known manner or by splash of transmission oil on the exposed portions of the balk.

Two embodiments of a synchronizer mechanism with self-energizing and with improved neutral positioning has been disclosed. Many variations and modifications of the embodiments are believed to be within the spirit of the invention. The following claims are intended to cover the inventive portions of disclosed mechanism and variations and modifications believed to be within the spirit of the invention.

What is claimed is:

1. A pin-type synchronizer mechanism selectively operative to frictionally synchronize and positive connect either of first and second axially spaced apart drives mounted for relative rotation about an axis of a shaft and secured against axial movement relative to the shaft; the mechanism comprising:

drive jaw means affixed to each drive and engageable with axially movable jaw means having axially extending internal splines slidably mating continuously with axially extending external splines affixed to the shaft;

first and second cone friction surfaces respectively defined by axially spaced apart first and second members respectively secured by attachment means for fixed rotation with the first and second drives and for limited axial movement away from the space between the gears, and third and fourth cone friction surfaces defined by a pair of axially spaced apart rings concentric to the shaft drives and axially movable between the spaced apart drives for axial movement into engagement respectively with the first and second friction surfaces to synchronize the drives with the shaft;

a flange extending radially between the rings for axially moving the movable rings and jaw means into said engagement in response to an axial bidirectional shift force ($F_o$) applied to the flange, means securing the flange against axial movement relative to the axially movable jaw means;

blocker means for preventing engagement of the jaw means prior to the synchronizing, the blocker means including a plurality of circumferentially spaced apart and axially extending pins rigidly securing the rings together, the pins extending through openings in the flange, each pin having axially spaced apart blocker shoulders engageable with blocker shoulders defined on opposite sides of the flange and about the associated opening;

pre-energizer means for engaging either one of the third and fourth friction surfaces respectively with the first and second friction surfaces in response to initial axial movement of the flange by the shift force from a neutral position toward one of the drives, for engaging the blocker means in response to engagement of the friction surfaces producing a synchronizing torque transmitted to the flange via the pins, and for transmitting the shift force to the engaged friction surfaces via the engaged blocker means to increase the engaging force of the engaged friction surfaces; characterized by:

the attachment means allowing axial movement of the first and second friction members toward the friction rings; and a plurality of circumferentially spaced apart rigid members axially interposed between the first and second members for limiting axial movement thereof toward the friction rings.

2. The synchronizer mechanism of claim 1, including:

first self-energizing means including first and second ramp means engageable in response to synchronizing torque ($T_o$) in one direction for reacting the synchronizing torque between the friction means and the shaft means and for producing an axial additive force ($F_a$) for further increasing the force engaging the first friction means.

3. The synchronizer mechanism of claim 1, further including:

the means securing the flange allowing circumferential movement of the flange relative to the axially movable jaw means;

at least one of the spaces between the external spline teeth having a first ramp surface formed in at least one of the pairs of flank surfaces thereof, the first ramp surface forming an angle less than ninety degrees relative to a plane normal to the shaft axis and the flank surfaces; and reaction means extending radially inward from the flange and into the one space, the reaction means including a second ramp surface substantially parallel to the first ramp surface and engageable therewith in response to synchronizing torque in one direction from engaged friction means associated with the first drive for producing an axial additive force on the flange in a direction of the shift force for increasing the engaging force of the friction means associated with the first drive.

4. The mechanism of claim 1, wherein:

the attachment means includes a plurality of sets of circumferentially spaced apart openings extending axially through the pair of rings and the flange, and the rigid members each being an elongated member slidably disposed in one of the sets of openings and having opposite ends in relatively close abutting relation with first and second members.

5. The mechanism of claim 4, including means for retaining the elongated members in the openings prior to installation of the rings between the first and second members.

6. The synchronizer mechanism of claim 4, further including:

the means securing the flange allowing circumferential movement of the flange relative to the axially movable jaw means;

at least one of the spaces between the external spline teeth having a first ramp surface formed in at least one of the pairs of flank surfaces thereof, the first ramp surface forming an angle less than ninety degrees relative to a plane normal to the shaft axis and the flank surfaces; and reaction means extending radially inward from the flange and into the one space, the reaction means including a second ramp surface substantially parallel to the first ramp surface and engageable therewith in response to synchronizing torque in one direction from engaged friction means associated with the first drive for producing an axial additive force on the flange in a direction of the shift force for increasing the engaging force of the friction means associated with the first drive.

7. The synchronizer mechanism of claim 4, including:

first self-energizing means including first and second ramp means engageable in response to synchronizing torque ($T_o$) in one direction for reacting the synchronizing torque between the friction means and the shaft means and for producing an axial additive force ($F_a$) for further increasing the force engaging the first friction means.

8. The mechanism of claim 4, wherein:

the opposite ends of each elongated member include antifriction means.

9. The mechanism of claim 8, wherein:

the antifriction means include a ball bearing retained in a pocket in each end of each elongated member.

* * * * *